United States Patent Office.

CARL DUISBERG, OF BARMEN, PRUSSIA, GERMANY.

COLORING-MATTER OBTAINED FROM TETRAZO-DITOLYL.

SPECIFICATION forming part of Letters Patent No. 329,633, dated November 3, 1885.

Application filed July 29, 1885. Serial No. 172,982. (Specimens.)

*To all whom it may concern:*

Be it known that I, CARL DUISBERG, residing at Barmen, in the Kingdom of Prussia and Empire of Germany, have invented a new and useful Improvement in the Manufacture of Dye-Stuffs or Coloring-Matters, of which the following is a specification.

My invention relates to the production of a new red color for dyeing on cotton by the action of tetrazo-ditolyl upon the beta-naphthylamine sulpho-acids.

In order to obtain my new color practically, I proceed as follows: Ten (10) kilos toluidine sulphate (produced by the alkaline reduction of the technical nitro-toluol and the transformation of the hydrazo-toluol formed with concentrated acids) are suspended in a finely-comminuted condition in water. To this twenty kilos of muriatic acid of 21° Baumé are added, and when this solution is cooled by ice 4.4 kilos of sodium nitrite dissolved in water are gradually added. In this way a reddish-yellow solution of tetrazo-ditolyl chloride is formed. If this solution is now poured into twelve kilos of beta-naphthylamine sulpho-acid suspended in a finely-comminuted condition in water, and acetate of soda is added until the solution has a feeble scent of acetic acid, (until all free mineral acid present has been replaced by acetic acid,) then a dark-brown precipitate is obtained, which, after having been allowed to stand for about twenty-four hours, is filtered, washed with cold water, and transformed into the soda salt. The thus-obtained dye-stuff of the composition,

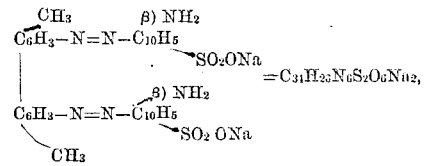

forms as a soda salt a beautiful red amorphous powder, which easily dissolves in hot water, is insoluble in cold water, and is changed by concentrated acids in the formation of the dye-stuff acid. It is isomeric to the dye-stuff obtained from tetrazo-ditolyl and naphthionic acid, and dyes, like that color, not mordanted cotton in a boiling soap bath a splendid alizarine-red, although a little yellower, but materially differs from the latter by being of greater fastness to acids and light. Cotton yarn dyed by it will not be altered by acetic acid, and is even fast to diluted mineral acids.

What I claim as my invention, and desire to secure by Letters Patent, is—

The coloring-matter herein described, which is produced by the action of tetrazo-ditolyl upon the beta-naphthylamine sulpho-acids by the process herein described, or by any other process which will produce a like result, substantially as described.

In testimony whereof I have signed my name to this specification in the presence of two subscribing witnesses.

CARL DUISBERG.

Witnesses:
 HERM. MATTHIS,
 RICHARD LEKEBUSCH.

Correction in Letters Patent No. 329,633.

It is hereby certified that in Letters Patent No. 329,633, granted Nov. 3, 1885, upon the application of Carl Duisberg, of Barmen, Prussia, Germany, for an improvement in "Coloring Matter Obtained from Tetrazo-Ditolyl," an error appears in the printed specification requiring correction, as follows: In line 13 the word "toluidine" should read *tolidin;* and that the Letters Patent should be read with this correction therein to make it conform to the record of the case in the Patent Office.

Signed, countersigned, and sealed this 23d day of February, A. D. 1886.

[SEAL.]

H. L. MULDROW,
*Acting Secretary of the Interior.*

Countersigned:

M. V. MONTGOMERY,
*Commissioner of Patents.*